United States Patent
Shoda

(10) Patent No.: US 10,225,470 B2
(45) Date of Patent: Mar. 5, 2019

(54) IMAGING APPARATUS AND CONTROL METHOD THEREOF

(71) Applicant: CANON KABUSHIKI KAISHA, Tokyo (JP)

(72) Inventor: Ryosuke Shoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/806,434

(22) Filed: Nov. 8, 2017

(65) Prior Publication Data

US 2018/0139387 A1    May 17, 2018

(30) Foreign Application Priority Data

Nov. 14, 2016  (JP) ................................ 2016-221251

(51) Int. Cl.
 *H04N 5/232*  (2006.01)
(52) U.S. Cl.
 CPC ..... *H04N 5/23241* (2013.01); *H04N 5/23293* (2013.01)
(58) Field of Classification Search
 CPC ................................................. H04N 5/23241
 USPC ...................................................... 348/333.1
 See application file for complete search history.

(56) References Cited

U.S. PATENT DOCUMENTS 8,749,701 B2 *  6/2014  Hwang ............. H04N 5/23203
                                                                  348/372

FOREIGN PATENT DOCUMENTS

JP    2015-029188 A    2/2015
JP    2015-041908 A    3/2015

OTHER PUBLICATIONS

The above patent document was cited in a European Search Report dated May 4, 2018, that issued in the corresponding European Patent Application No. 17200760.1.

* cited by examiner

*Primary Examiner* — Joel W Fosselman
(74) *Attorney, Agent, or Firm* — Cowan, Liebowitz & Latman, P.C.

(57) ABSTRACT

An imaging apparatus according to the present invention, includes: an imaging unit; a display unit; and a control unit configured, in a period of performing a repeated recording process to perform imaging by the imaging unit at every set interval time and record a captured image in a recording medium, to perform control such that a live-view display on the display unit is turned OFF and driving of the imaging unit is stopped in a case where the interval time is a specific time or longer, and such that the live-view display on the display unit is turned OFF, but the driving of the imaging unit is not stopped in a case where the interval time is less than the specific time.

20 Claims, 8 Drawing Sheets

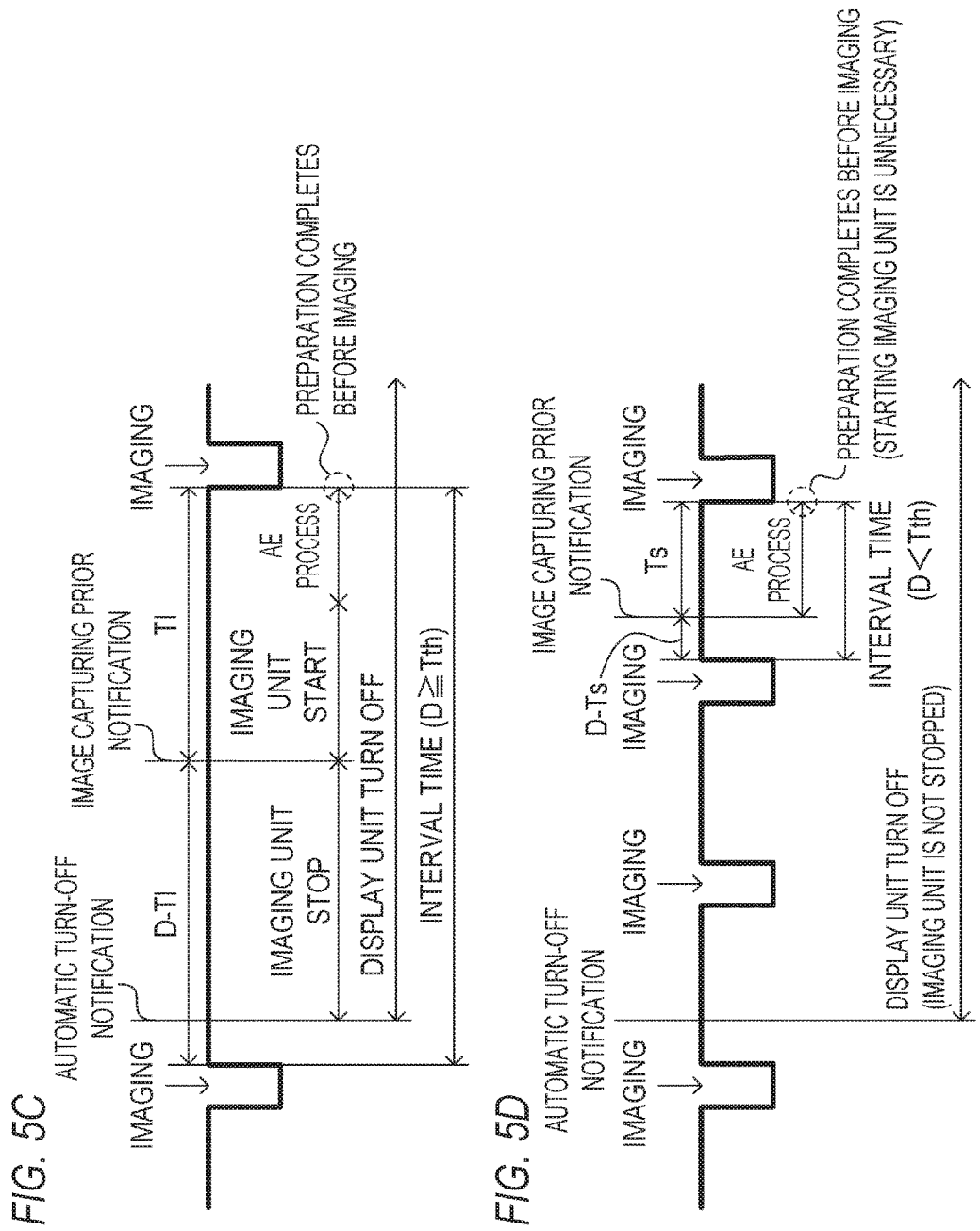

IMAGING APPARATUS AND CONTROL METHOD THEREOF

BACKGROUND OF THE INVENTION

Field of the Invention

The present invention relates to an imaging apparatus and a control method thereof.

Description of the Related Art

A repeated recording process, in which an imaging process and a recording process to record the captured image in a storage unit are performed at every predetermined time, is known as a process (function) of an imaging apparatus. The repeated recording process is called "interval imaging", "time-lapse imaging" and the like. In the repeated recording process, a captured image is recorded as one frame of a moving image, for example. The moving image generated by the repeated recording process is called a "time-lapse moving image". According to the repeated recording process, a moving image, in which clouds, scenery and the like change faster than real-time, can be generated as a time-lapse moving image, for example.

A technique of the repeated recording process is disclosed in Japanese Patent Application Publication No. 2015-29188, for example. According to the technique disclosed in Japanese Patent Application Publication No. 2015-29188, if the time from the current recording process to the next recording process is a predetermined time or less, a reduction process, for temporarily reducing the power consumption of the imaging apparatus, is omitted so that the timing of the next recording process is not delayed.

SUMMARY OF THE INVENTION

In the case of generating a time-lapse moving image, the repeated recording period (period in which the repeated recording process is performed) is long. Therefore in the repeated recording period, the lower the power consumption of the imaging apparatus the better. However, in the technique disclosed in Japanese Patent Application Publication No. 2015-29188, the reduction process is omitted when the time from the current recording process to the next recording process is a predetermined time or less. This means that in the case of the technique disclosed in Japanese Patent Application Publication No. 2015-29188, the power consumption of the imaging apparatus may not be sufficiently reduced. However if the reduction process is performed, regardless whether the time from the current recording process to the next recording process is a predetermined time or less, then the timing of the next recording process may be delayed from the desired timing.

The present invention provides a technique to more appropriately implement both the reduction of the power consumption of the imaging apparatus and the execution of the recording process at a desired timing in the repeated recording period.

An imaging apparatus according to the present invention, includes:

an imaging unit;

a display unit; and a control unit configured, in a period of performing a repeated recording process to perform imaging by the imaging unit at every set interval time and record a captured image in a recording medium, to perform control such that a live-view display on the display unit is turned OFF and driving of the imaging unit is stopped in a case where the interval time is a specific time or longer, and such that the live-view display on the display unit is turned OFF, but the driving of the imaging unit is not stopped in a case where the interval time is less than the specific time.

According to the present invention, both the reduction of the power consumption of the imaging apparatus and the execution of the recording process at a desired timing can be more appropriately implemented in the repeated recording period.

Further features of the present invention will become apparent from the following description of exemplary embodiments with reference to the attached drawings.

BRIEF DESCRIPTION OF THE DRAWINGS

FIGS. 5C and 5D are diagrams depicting an example of the effect of this embodiment.

DESCRIPTION OF THE EMBODIMENTS

Figure 1A:
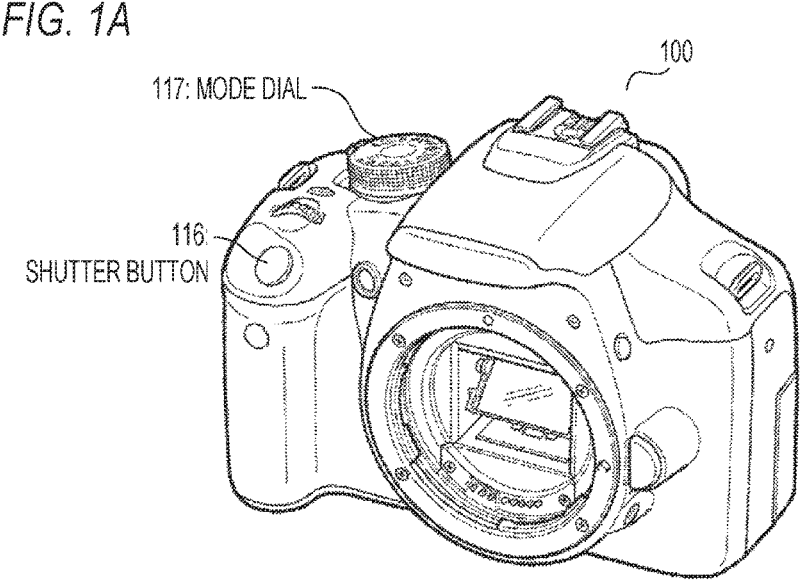
FIGS. 1A and 1B are external views of a digital camera according to this embodiment.
Figure 1B:
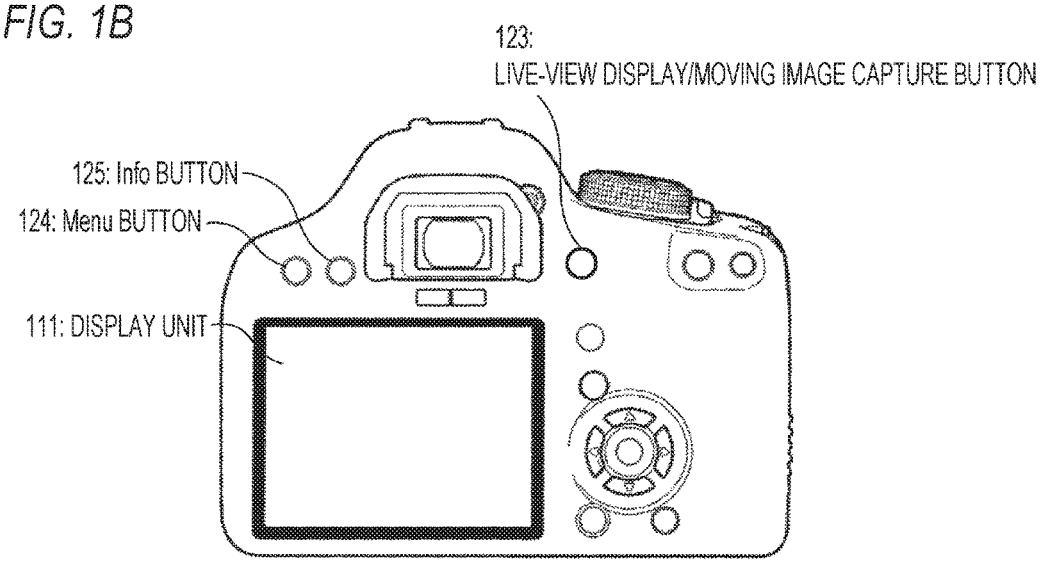

Embodiments of the present invention will be described. FIGS. 1A and 1B are external views of a digital camera 100, which is an example of an electronic device, FIG. 1A is a perspective view, and FIG. 1B is a rear view.

A display unit 111 displays a captured image, various information and the like. For example, a combination of a backlight unit and a liquid crystal panel can be used as the display unit 111. A display panel including light-emitting display elements may be used for the display unit 111. In concrete terms, an organic EL display panel, a plasma display panel or the like can be used as the display unit 111.

A Shutter button 116, a Mode dial 117, a Menu button 124, an Info button 125 and a Live-view display/moving image capture button 123 are operation units used by the user to perform an operation.

The Shutter button 116 outputs an instruction to prepare imaging, an instruction to execute imaging or the like in accordance with the operation performed by the Shutter button 116.

The Mode dial 117 outputs an instruction to switch the operation mode of the digital camera 100 in accordance with the operation performed using the Mode dial 117. The operation modes are a still image recording mode, a moving image recording mode and the like.

The Menu button 124 outputs an instruction for setting various information in accordance with the operation performed using the Menu button 124. The Info button 125 also outputs an instruction for setting various information in accordance with the operation performed using the Info button 125.

The Live-view display/moving image capture button 123 outputs an instruction corresponding to an operation mode which is set in accordance with the operation performed using the Live-view display/moving image capture button 123. For example, if the still image recording mode is set, the Live-view display/moving image capture button 123 outputs an instruction to start/end the live-view display. The live-view display is a process when the display unit 111 displays a live image in real-time. By performing the live-view display, the display unit 111 can be used as an electronic view finder. When the moving image recording mode is set, the Live-view display/moving image capture button 123 outputs an instruction to start/end the moving image capturing.

Figure 2:
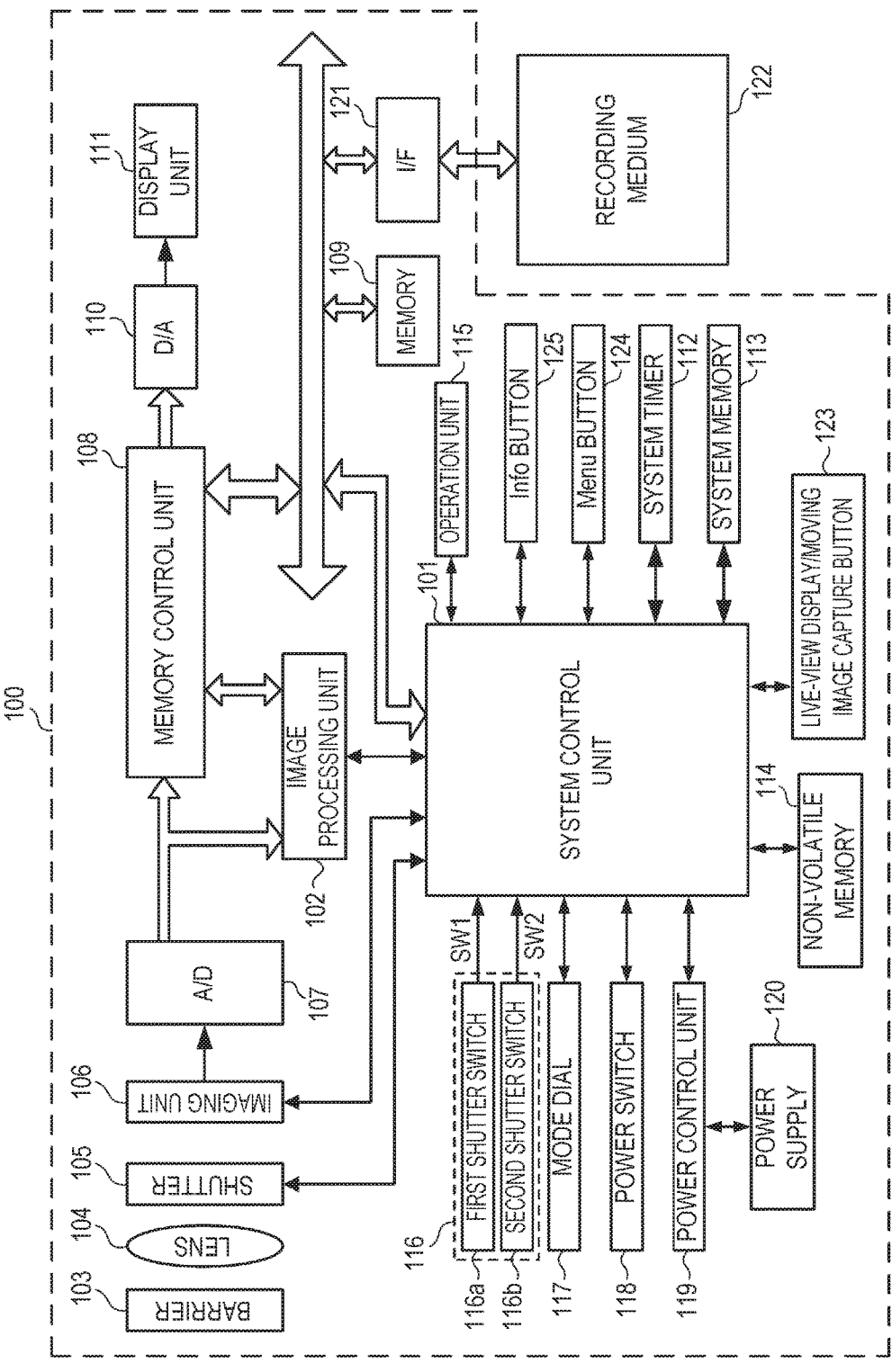
FIG. 2 is a block diagram depicting a configuration example of a digital camera according to this embodiment.

FIG. 2 is a block diagram depicting a configuration example of the digital camera 100.

A barrier 103 covers an imaging system of the digital camera 100, so as to prevent contamination of and damage to the imaging system. The imaging system includes at least an imaging lens 104. For example, the imaging system includes the imaging lens 104, a shutter 105 and an imaging unit 106. The imaging lens 104 is a lens group including a zoom lens and a focus lens. The shutter 105 is a shutter having an aperture function.

The imaging unit 106 is an image pickup element (image sensor) constituted by CCD, CMOS elements and the like for converting an optical image into electric signals.

An A/D converter 107 converts analog signals output from the imaging unit 106 into digital signals, and outputs the obtained digital signals.

An image processing unit 102 performs predetermined image process on the captured image data output from the A/D converter 107, on image data output from the memory control unit 108 and the like. The predetermined image process is, for example, an interpolation process to generate an interpolated pixel between pixels, a resize process to shrink or enlarge an image, and a color conversion process to convert a color of an image. The image processing unit 102 also performs a predetermined arithmetic process using the captured image data, and outputs the process result (result of the predetermined arithmetic process) to a system control unit 101. The system control unit 101 performs a predetermined control process based on the process result output from the image processing unit 102.

The predetermined arithmetic process is, for example, a process to calculate the exposure amount for the imaging unit 106, a process to calculate the distance to the object, a process to determine the hue of the captured image and the like. Based on the results of these arithmetic processes, the system control unit 101 performs through-the-lens (TTL) type auto focus (AF) process, automatic exposure (AE) process, EF (pre-flash) process, TTL type auto white balance (AWB) process and the like. In these control processes, the position of the lens 104, the shutter speed of the shutter 105, the aperture of the shutter 105, the conversion characteristic of the imaging unit 106, the conversion characteristic of the A/D converter 107, the parameters to the used for a predetermined image process by the image processing unit 102 and the like are controlled.

A memory control unit 108 writes the image data to a memory 109, reads the image data from the memory 109, writes the image data to a recording medium 122, and reads the image data from the recording medium 122, for example. The memory control unit 108 outputs the read image data to the image processing unit 102 if it is necessary to perform a predetermined image process on the image data read from the memory.

The captured image data output from the A/D converter 107 is written to the memory 109 via the image processing unit 102 and the memory control unit 108, or via the memory control unit 108. The memory 109 stores various image data (e.g. captured image data, other image data displayed on the display unit 111) which are digital signals. The memory 109 has sufficient memory capacity to store a predetermined number of still images, moving images for a predetermined time, voice data for a predetermined time and the like. The memory 109 also plays the role of the memory for display (video memory).

A D/A converter 110 acquires the image data for display, which is digital signals, from the memory 109 via the memory control unit 108, converts the acquired digital signals into analog signals, and supplies the acquired analog signals to the display unit 111. Then the display unit 111 displays an image in accordance with the analog signal supplied from the D/A converter 110. In other words, the display unit 111 displays an image based on the image data for display which was written in the memory 109.

A method of performing the live-view will be described. First images are captured by the imaging unit 106 at a predetermined imaging rate, and digital signals, which the A/D converter 107 converted from analog signals, are recorded in the memory 109. Then the D/A converter 110 acquires the digital signals of the captured image from the memory 109 via the memory control unit 108, converts the acquired digital signals into analog signals, and supplies the acquired analog signals to the display unit 111. Then the display unit 111 displays an image (live image) in accordance with the analog signals supplied from the D/A converter 110. The live-view display can be performed by these processes that are sequentially executed in real-time.

The captured image data, which is output from the A/D converter 107, is written in the recording medium 122 via the image processing unit 102, the memory control unit 108 and a recording medium I/F 121, or via the memory control unit 108 and the recording medium I/F 121. The recording medium I/F 121 is an interface to connect the recording medium 122 (e.g. memory card, hard disk) to the digital camera 100. A semiconductor memory, a magnetic disk, an optical disk or the like can be used for the recording medium 122.

A non-volatile memory 114 is a memory in which data can be electrically stored or stored data can be electrically erased. For the non-volatile memory 114, an EEPROM, for example, can be used. In the non-volatile memory 114, the operation parameters of the system control unit 101, the operation programs of the system control unit 101 and the like are stored. The operation programs of the system control unit 101 are programs that perform the later mentioned process flow.

In this embodiment, the memory control unit 108 can execute the repeated recording process, in which the recording process is performed at every set interval time. The repeated recording process is called "interval imaging", "time-lapse imaging" or the like. In the repeated recording process, an image acquired in one imaging step is recorded as one frame of a moving image, for example. The moving image generated by the repeated recording process is called a "time-lapse moving image".

The non-volatile memory 114 records set values (values which were set) related to the repeated recording process. The set values related to the repeated recording process include a set value on whether the repeated recording process is performed or not, a set value of the interval time, and a set value of the number of times of the recording process performed in the repeated recording process. Further, the set values related to the repeated recording process include a set value on whether AE process (second process) is performed for each frame, and a set value on whether the display unit 111 is automatically turned OFF in the repeated recording process. The set values will be described in detail later. The set values may be automatically set depending on the state of the digital camera 100, the ambient environment (imaging environment) of the digital camera 100 and the like, but in this embodiment, the set values are set in accordance with the operation by the user.

The set values related to the repeated recording process are not limited to the above-mentioned plurality of set values. For example, any one of the above-mentioned plurality of set values may not be used as the set value related to the repeated recording process. This means that, for the set values related to the repeated recording process, a set value of the frame rate of the time-lapse moving image, which is generated by the repeated recording process, may be used. Also for the set value related to the repeated recording process, a set value of the image resolution of the time-lapse moving image, which is generated by the repeated recording process (a set value of the image resolution of the captured image recorded by the recording process), may be used. Further, for the set value related to the repeated recording process, a set value of the duration (time) of the period when the repeated recording process is performed, a set value of the time until the display unit 111 is automatically turned OFF, a set value of the execution frequency of the automatic exposure (AE) process and the like may be used.

The second process is not limited to the AE process (process to automatically adjust the exposure value). For example, the second process may be a process to automatically adjust the imaging parameter other than the exposure value (e.g. focus value, shutter speed value, aperture value, ISO sensitivity value), or may be a process to automatically adjust a plurality of imaging parameters. The second process may be any process that is based on one or more captured images generated thus far, and is a process related to the generation of the captured image to be the target of the next recording process.

The system control unit 101 controls the process of each functional unit of the digital camera 100, the state of each functional unit of the digital camera 100 and the like. For example, the system control unit 101 controls the display of the display unit 111 by controlling the memory control unit 108, the D/A converter 110, the display unit 111 and the like. The system control unit 101 implements each process mentioned later by executing the programs recorded in the non-volatile memory 114.

A system memory 113 is a memory that temporarily stores data (work memory). For the system memory 113, RAM, for example, can be used. In the system memory 113, parameters (constants and variables) for operating the system control unit 101, programs read from the non-volatile memory 114 and the like are developed.

A system timer 112 is a clocking unit which measures the time that is used for various controls (e.g. time for repeated recording process), the time of an internal clock and the like.

The Menu button 124 outputs an instruction for setting various information to the system control unit 101 in accordance with the operation which the user performed using the Menu button 124. The Info button 125 also outputs an instruction for setting various information to the system control unit 101 in accordance with the operation which the user performed using the Info button 125.

The Mode dial 117 outputs an instruction to switch the operation mode of the digital camera 100 to the system control unit 101 in accordance with the operation which the user performed using the Mode dial 117. Responding to an instruction from the Mode dial 117, the system control unit 101 switches the operation mode to be set, among a plurality of operation modes, including the still image recording mode and the moving image recording mode. The still image recording mode further includes an auto imaging mode, an auto scene determination mode, a manual mode, a plurality of scene modes corresponding to a plurality of scenes (imaging environments), a program AE mode and a custom mode, for example. By operating the Mode dial 117, any one of the above-mentioned operation modes included in the still image recording mode can be set. After setting the still image recording mode in accordance with the operation of the Mode dial 117, any one of the above-mentioned operation modes included in the still image recording mode may be set responding to the operation performed using another operation unit. In the same manner, the moving image mode may include a plurality of operation modes.

The Live-view display/moving image capture button 123 outputs an instruction corresponding to the operation mode that is set, to the system control unit 101 in accordance with the operation which the user performed using the Live-view display/moving image capture button 123.

A case where the still image recording mode is set and the live-view display is not being performed is now considered. In this case, the Live-view display/moving image capture button 123 outputs a live-view display start notification to the system control unit 101 in accordance with the operation using the Live-view display/moving image capture button 123. Then the system control unit 101 performs the process to start the live-view display in accordance with the live-view display start notification. Next a case where the still image recording mode is set and the live-view display is performed is considered. In this case, the Live-view display/moving image capture button 123 outputs a live-view display end notification to the system control unit 101 in accordance with the operation performed using the Live-view display/moving image capture button 123. Then the system control unit 101 performs a process to end the live-view display in accordance with the live-view display end notification.

When the moving image recording mode is set and the moving image capturing is not performed, the Live-view display/moving image capture button 123 outputs a moving image capturing start notification to the system control unit 101 in accordance with the operation performed using the Live-view display/moving image capture button 123. Then the system control unit 101 performs the process to start the moving image capturing in accordance with the moving image capturing start notification. In concrete terms, a repeat of the recording process, to record the current captured image in the recording medium 122 as a part of the moving image, is started. When the moving image recoding mode is set and the moving image capturing is performed, the Live-view display/moving image capture button 123 outputs a moving image capturing end notification to the system control unit 101 in accordance with the operation performed using the Live-view display/moving image capture button 123. Then the system control unit 101 performs the process to end the moving image capturing in accordance with the moving image capturing end notification. In concrete terms, the above-mentioned repeating ends, and the moving image based on the plurality of captured images acquired during this repeating is recorded in the recording medium 122.

The Shutter button 116 outputs an instruction to prepare for imaging, an instruction to execute imaging and the like to the system control unit 101 in accordance with the operation which the user performed using the Shutter button 116. The Shutter button 116 includes a first shutter switch 116a and a second shutter switch 116b.

The first shutter switch 116a outputs a first shutter switch signal SW1 (an instruction to prepare for imaging) to the system control unit 101 in accordance with the first operation which the user performed using the Shutter button 116. The first operation is an operation to half-depress the Shutter button 116. The system control unit 101 performs, the AF process, the AE process, the AWB process, the EF process or the like in accordance with the first shutter switch signal SW1.

The second shutter switch 116b outputs a second shutter switch signal SW2 (an instruction to execute imaging) to the system control unit 101 in accordance with the second operation which the user performed using the Shutter button 116. The second operation is an operation to fully depress the Shutter button 116. The system control unit 101 performs a process for imaging in accordance with the second shutter switch signal SW2. In other words, imaging performed in accordance with the second shutter switch signal SW2.

The imaging in accordance with the second shutter switch signal SW2 may be a process to record the captured image in the recording medium 122 as a still image (still image file), or maybe a process to record the captured image in the recording medium 122 as a moving image file.

An operation unit 115 includes a plurality of operation members. Each operation member outputs the instruction in accordance with the operation which the user performed using the operation member to the system control unit 101. For example, in accordance with the operation to select various function icons that are displayed on the display unit 111, a function is assigned to each operation member, or the function assigned to each operation member is changed. By assigning a function to an operation member, the operation member functions as a function button which has the assigned function, for example. The function buttons are, for example, an end button, a return button, an image feed button, a jump button, a narrowing button, and an attribute change button. For example, in accordance with the operation performed using the Menu button 124, a menu screen for various settings is displayed on the display unit 111. Then in accordance with the operation performed using the operation unit 115, various settings, including the shutter speed value, the aperture value and the exposure value, are performed.

A power control unit 119 supplies the necessary power (e.g. voltage, current) to each functional unit of the digital camera 100. In this embodiment, the power control unit 119 also supplies the necessary power to the recording medium 122. In concrete terms, the power control unit 119 includes a power detection circuit, a DC-DC converter, a switch circuit to switch a functional unit to which power is supplied and the like. The power detection circuit detects whether a power supply 120 is attached to the digital camera 100, a type of the power supply 120 attached to the digital camera 100, the residual capacity of a battery, which is the power supply 120 attached to the digital camera 100, and the like. After detection, the power control unit 119 controls the DC-DC converter based on an instruction from the system control unit 101, thereby it supplies the necessary voltage to each functional unit, including the recording medium 122, during a necessary period.

Power may be supplied to the recording medium 122 by a functional unit that is different from a functional unit of the digital camera 100. For example, the recording medium (storage device) 122 may include its own power supply.

The power supply 120 is a power supply that is detachable from the digital camera 100. For the power supply 120, a primary battery, a secondary battery or an AC adapter, for example, can be used. The primary battery is an alkaline battery, a lithium battery or the like, the secondary battery is a NiCd battery, a NiMH battery, a Li-ion battery or the like.

A power switch 118 outputs an instruction to switch the state of the digital camera 100 to the system control unit 101 in accordance with the operation which the user performed using the power switch 118. In concrete terms, if the digital camera 100 is not started, the power switch 118 outputs an instruction to start the digital camera 100 to the system control unit 101 in accordance with the operation performed using the power switch 118. Then the system control unit 101 performs the process to start the digital camera 100. For example, the system control unit 101 outputs an instruction to start supplying power to the power control unit 119. Then the power control unit 119 starts supplying power to each functional unit of the digital camera 100. If the digital camera 100 has been started, the power switch 118 outputs an instruction to stop the digital camera 100 to the system control unit 101 in accordance with the operation performed using the power switch 118. Then the system control unit 101 outputs the process to stop the digital camera 100. For example, the system control unit 101 outputs an instruction to stop supplying power to the power control unit 119. Then the power control unit 119 stops supplying power to each functional unit of the digital camera 100.

As mentioned above, the digital camera 100 can execute the repeated recording process to perform the recording process at every set interval time. An example of the setting for the repeated recording process will be described with reference to FIGS. 3A to 3G. FIGS. 3A to 3G depict an example of the setup screen of the repeated recording process. For example, the setup screens in FIGS. 3A to 3G are displayed by the system control unit 101 which controls the process of the memory control unit 108 in accordance with an instruction which is output from the Menu button 124, the operation unit 115 or the like.

Figure 3A:
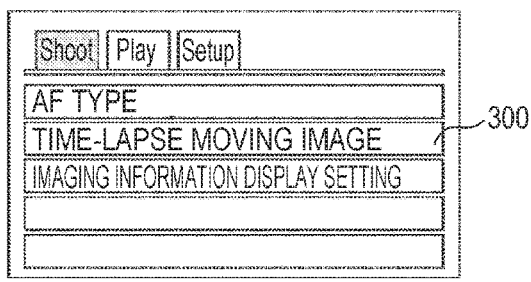
FIGS. 3A to 3G are diagrams depicting an example of the setting screens of the repeated recording process according to this embodiment.

When the user depresses the Menu button 124, the setup screen (menu screen) in FIG. 3A is displayed. The setup screen in FIG. 3A includes a plurality of items (general items) for one or more types of settings. In concrete terms, the "AF type" which is an item for setting type of the AF process, a "Time-lapse moving image (300)" which is an item for setting the repeated recording process, and "imaging information display setting" which is an item for setting various imaging parameters are included.

Figure 3B:
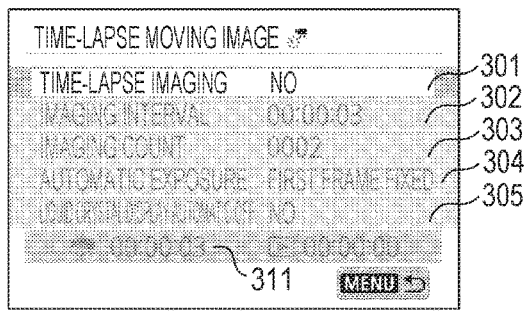

When the user performs the operation to select the time-lapse moving image 300 on the setup screen in FIG. 3A using the operation unit 115, the displayed setup screen is switched from the setup screen in FIG. 3A to the setup screen in FIG. 3B. The setup screen in FIG. 3B includes a plurality of items corresponding to the plurality of settings for the repeated recording process respectively. In concrete terms, "time-lapse imaging (301)", "imaging interval (302)", "Imaging count (303)", "automatic exposure (304)" and "liquid crystal display automatic OFF (305)" are included. The time-lapse imaging 301 is an item for setting whether the repeated recording process is performed or not. The imaging interval 302 is an item for setting the interval time. The imaging count 303 is an item for setting the number of times of imaging (recording process) in the repeated recording process. The automatic exposure 304 is an item for setting whether the AE process is performed for each frame or not. The liquid crystal display automatic OFF 305 is an item for setting whether the display unit 111 is automatically turned OFF or not in the repeated recording process.

Figure 3C:
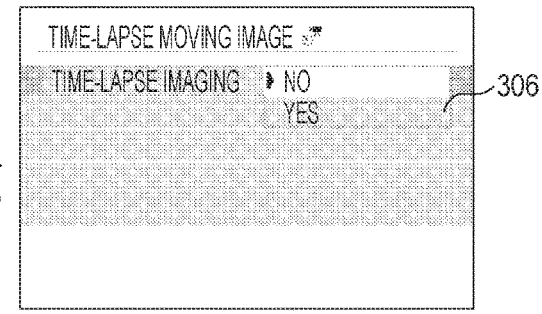

When the user performs the operation to select the time-lapse imaging 301 on the setup screen in FIG. 3B using the operation unit 115, the displayed setup screen changes from the setup screen in FIG. 3B to the setup screen in FIG. 3C. When the user performs an operation in an operation region 306 on the setup screen in FIG. 3C using the operation unit 115, an instruction in accordance with this operation is output from the operation unit 115 to the system control unit 101. Then the system control unit 101 sets whether the repeated recording process is performed or not in accordance with the instruction from the operation unit 115.

When a predetermined condition is satisfied, the displayed setup screen is returned to the setup screen in FIG. 3B. For example, when the setting is performed on the displayed setup screen, when operation to return the display to the previous setup screen is performed, or when a predetermined time has elapsed from the display of the setup screen, the displayed setup screen is returned to the setup screen in FIG. 3B.

Figure 3D:
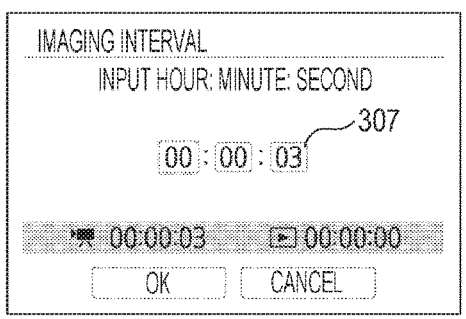

When the user performs the operation to select the imaging interval 302 on the setup screen in FIG. 3B using the operation unit 115, the displayed setup screen is switched from the setup screen in FIG. 3B to the setup screen in FIG. 3D. When the user performs the operation in an operation region 307 in the setup screen in FIG. 3D using the operation unit 115, an instruction corresponding to this operation is output from the operation unit 115 to the system control unit 101. Then the system control unit 101 sets the interval time in accordance with the instruction from the operation unit 115. The range of the interval time is not especially limited, but in this embodiment, an interval time can be set in the range of 1 second to 99 hours 59 minutes 59 seconds.

Figure 3E:
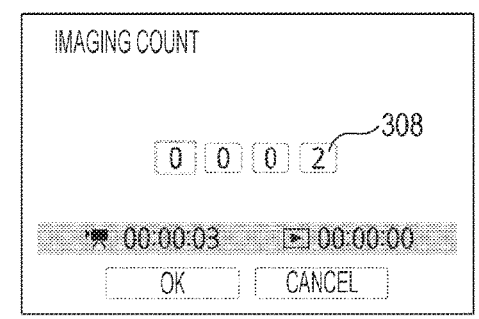

When the user performs an operation to select the imaging count 303 on the setup screen in FIG. 3B using the operation unit 115, the displayed setup screen is switched from the setup screen in FIG. 3B to the setup screen in FIG. 3E. When the user performs an operation in an operation region 308 on the setup screen in FIG. 3E using the operation unit 115, an instruction corresponding to this operation is output from the operation unit 115 to the system control unit 101. Then the system control unit 101 sets the number of times of imaging in the repeated recording process (the number of times of recording process in the repeated recording process: repeated imaging count) in accordance with the instruction from the operation unit 115. In this embodiment, if the imaging is performed for the repeated imaging count that is set here in the repeated recording process, the repeated recording process automatically ends. The range of the repeated imaging count is not especially limited, but in this embodiment, the repeated imaging count can be set in the range of 1 to 3600 times.

On the setup screens of the repeated recording process (e.g. the setup screen in FIG. 3B), the time required for the repeated recording process (repeated imaging time) is displayed in an imaging time display region 311. The repeated imaging time is determined depending on the set value of the interval time and the set value of the repeated imaging count. In concrete terms, the repeated imaging time can be calculated by multiplying the interval time that is set by a number determined by subtracting 1 from the repeated imaging count that is set. The repeated imaging time is calculated by the system control unit 101, for example. If at least either one of the set value of the interval time and the set value of the repeated imaging count is updated on the setup screen, the display of the repeated imaging time is also updated.

Figure 3F:
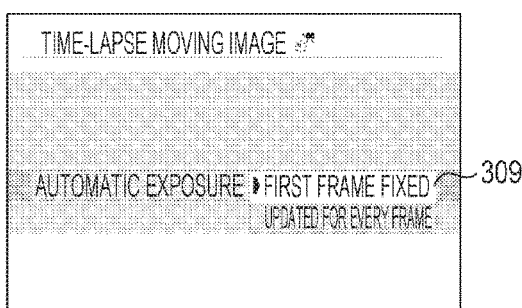

When the user performs an operation to select the automatic exposure 304 on the setup screen in FIG. 3B using the operation unit 115, the displayed setup screen is switched from the setup screen in FIG. 3B to the setup screen in FIG. 3F. When the user performs an operation in an operation region 309 in the setup screen in FIG. 3F using the operation unit 115, an instruction in accordance with this operation is output from the operation unit 115 to the system control unit 101. Then the system control unit 101 sets whether the AE process is performed for each frame or not in accordance with the instruction from the operation unit 115.

Figure 3G:
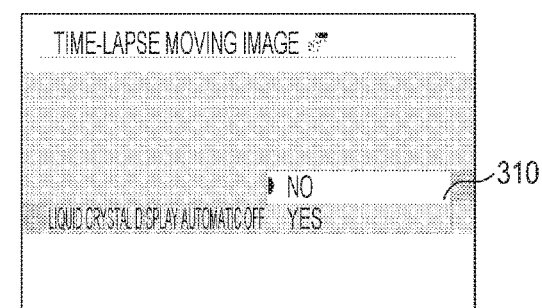

When the user performs an operation to select the liquid crystal display automatic OFF 305 on the setup screen in FIG. 3B using the operation unit 115, the displayed setup screen is switched from the setup screen in FIG. 3B to the setup screen in FIG. 3G. When the user performs an operation in an operation region 310 on the setup screen in FIG. 3G the operation unit 115, an instruction in accordance with this operation is output from the operation unit 115 to the system control unit 101. Then the system control unit 101 sets whether the display unit 111 is automatically turned OFF or not in the repeated recording process in accordance with the instruction from the operation unit 115. In this embodiment, it is 5 seconds until the display unit 111 is automatically turned OFF. In concrete terms, if it is set that the display unit 111 is automatically turned OFF, the display unit 111 is automatically turned OFF at a timing when 5 seconds have elapsed from the timing when the imaging (recording process) ended. If it is set that the display unit 111 is not automatically turned OFF, the display unit 111 not automatically turned OFF. The time until the display unit 111 is automatically turned OFF may be longer or shorter than 5 seconds.

Figure 4A:
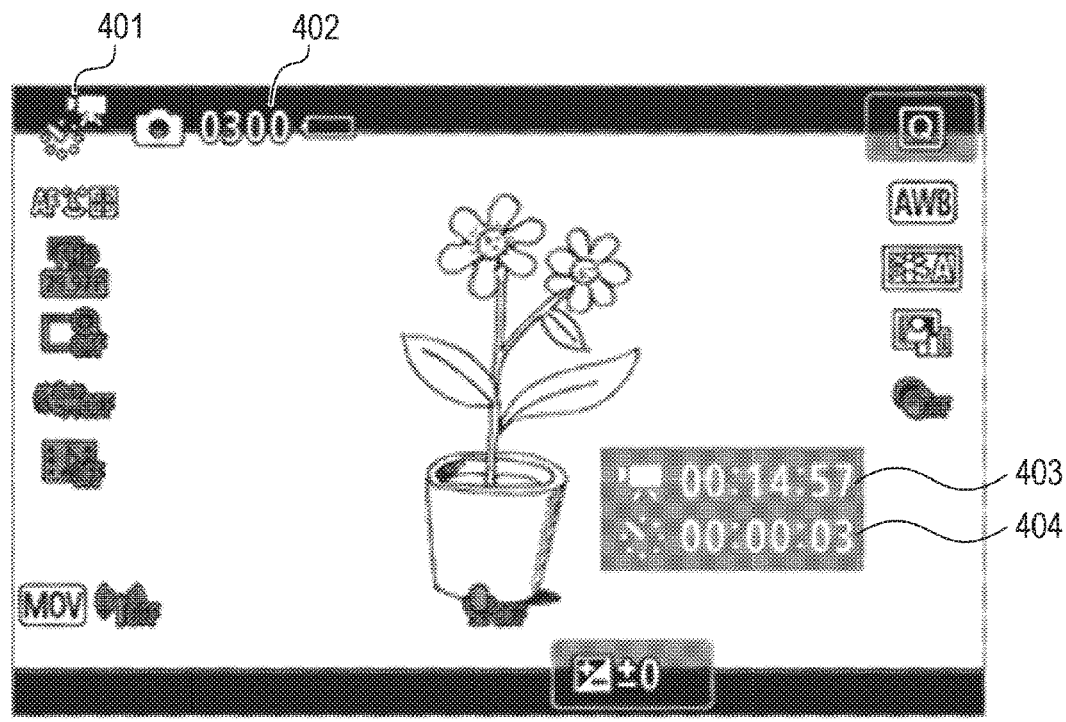
FIG. 4A is a diagram depicting an example of a standby screen of the repeated recording process according to this embodiment.

An example of a screen that is displayed in the state of waiting for an operation to execute the repeated recording process (standby screen) will be described with reference to FIG. 4A. When it is set that the repeated recording process is performed in the moving image recording mode, the standby screen in FIG. 4A is displayed. For example, if the user performs an operation to cancel the setup screen in the state when it is set that the repeated recording process is performed in the moving image recording mode, the display is switched from the setup screen to the standby screen in FIG. 4A. The standby screen in FIG. 4A displays: a mode icon 401; a repeated imaging count that is set 402; a repeated imaging time that is set 403; an interval time that is set 404; and the like. The mode icon 401 indicates that the repeated recording process is set.

An overview of the repeated recording process will be described. When the system control unit 101 receives a moving image capturing start notification via the Live-view display/moving image capture button 123 in a state when the standby screen in FIG. 4A is displayed, the system control unit 101 reads various set values related to the repeated recording process from the non-volatile memory 114. Then the system control unit 101 starts the repeated recording process based on the various set values that were read (e.g. interval time, repeated imaging count, execute/not execute AE process for each frame, execute/not execute automatic turning OFF of display unit 111).

After the repeated recording process is performed, the system control unit 101 performs the control based on the clocking using the system timer 112, so as to issue an image capturing notification at every interval time, and execute imaging (recoding process). In other words, imaging is performed at every interval time. In each imaging step, exposure by the imaging unit 106, reading the captured image data (analog signals) from the imaging unit 106, writing the captured image (digital signals) to the recording medium 122 and the like are performed. In this embodiment, the captured image is written to the recording medium 122 as one frame of the time-lapse moving image, so that a time-lapse moving image is generated at a predetermined frame rate.

In each imaging (capturing each frame image) in the repeated recording process, imaging is performed using an exposure value in accordance with the setting on whether the AE process is executed/not executed for each frame.

In the case where it is set that the AE process is not performed for each frame, the exposure value is automatically determined by the AE process in the first imaging step in the repeated recording process, and imaging is performed using the determined exposure value. Then in the second or later imaging steps in the repeated recording process, the imaging is performed using the exposure value that was used for the first imaging step in the repeated recording process. When it is set that the AE process is not performed for each frame, the exposure value in the first imaging step may be a predetermined exposure value.

In the case where it is set that the AE process is performed for each frame, the exposure value is determined by the AE process in each imaging step in the repeated recording process, and the imaging is performed using the determined exposure value. In the AE process, photometry is performed for a live image (in other words, brightness in the live image in the photometric range is acquired), and an exposure value, such as the aperture value and the shutter speed, is determined based on the photometric result. In this embodiment, an image capturing prior notification is issued just before each imaging in the repeated recording process. Then the AE process is performed in accordance with the issue of the image capturing prior notification. The image capturing prior notification is issued in an interval period when the imaging (recording process) is not performed. In concrete terms, the image capturing prior notification is issued during a period from the timing when the image capturing notification is issued to the timing when the next image capturing notification is issued. If the AE process has not been completed and the exposure value is not determined at the timing when the image capturing notification is issued, imaging cannot be performed with an intended exposure value, hence the imaging is skipped. In other words, the imaging corresponding to the image capturing notification is omitted.

After imaging, process in accordance with the setting whether the display unit 111 is automatically turned OFF or not is performed. If it is set that the display unit 111 is automatically turned OFF, the process to turn the display unit 111 OFF is performed at a timing when 5 seconds have passed from the timing when the imaging ended. If it is set that the display unit 111 is not automatically turned OFF, this process to turn the display unit 111 automatically OFF is not performed.

In this embodiment, the ON state and the OFF state of the display unit 111 are switched in accordance with the operation using the Info button 125 in the repeated recording period (period from the first imaging to the last imaging in the repeated recording process performed by one imaging start operation). The ON state is a state when the display unit 111 is ON, and the OFF state is a state when the display unit 111 is OFF. In this embodiment, the turn-off process to turn the display unit 111 OFF is performed in accordance with the operation by the Info button 125 performed in the ON state (first operation). Further, the turning ON process to turn the display unit 111 ON is performed in accordance with the operation by the info button 125 performed in the OFF state (second operation). The OFF process is also regarded as a "process to switch the state of the display unit 111 from the ON state to the OFF state", and the turn-on process is regarded as a "process to switch the state of the display unit 111 from the OFF state to the ON state". The first operation may be the operation performed by an operation unit that is different from an operation unit for the second operation.

When the Live-view display/moving image capture button 123 is operated, or when the number of times of imaging performed in the repeated recording process reaches the repeated imaging count, the repeated recording process ends.

Figure 4B:
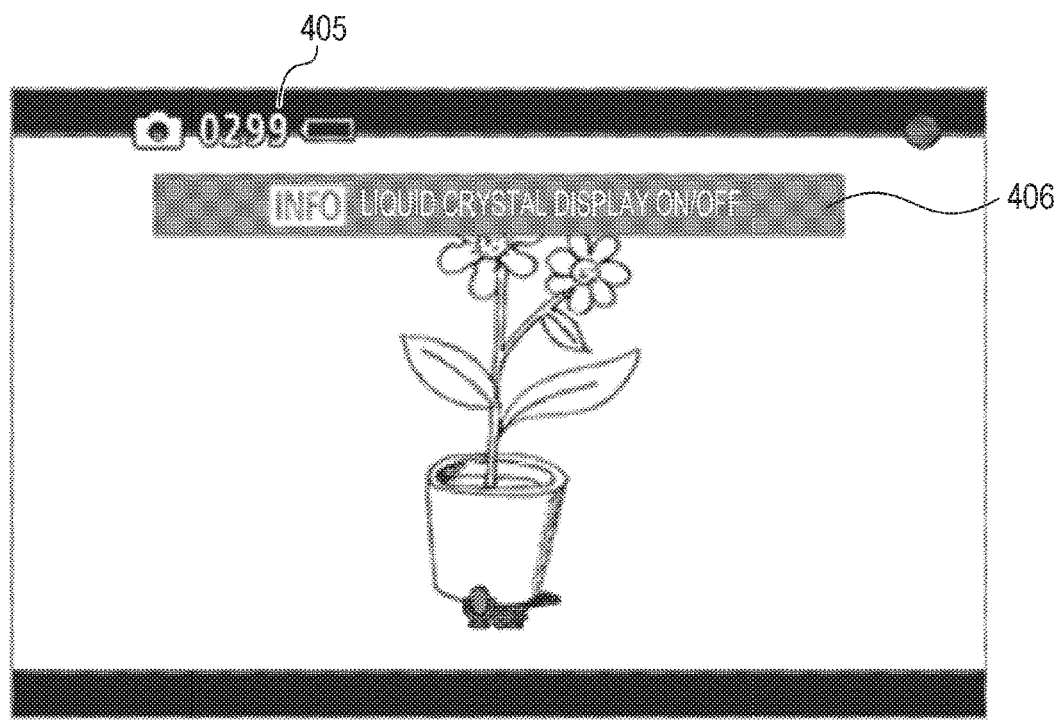
FIG. 4B is a diagram depicting an example of an imaging screen of the repeated recording process according to this embodiment.

An example of the screen that is displayed during the repeated recording period (imaging screen) will be described with reference to FIG. 4. When the repeated recording process starts, the display is switched from the standby screen in FIG. 4A to the imaging screen in FIG. 4B. In the imaging screen in FIG. 4B, the remaining imaging (recording process) count 405 in the repeated recording process and the notification image (text) 406 are displayed superimposed on the live image. The notification image 406 indicates that the state of the display unit 111 is switched between the ON state and the OFF state in accordance with the operation performed using the Info button 125.

An example of a problem to be solved in this embodiment will be described with reference to FIGS. 5A and 5B. In the case of generating a time-lapse moving image, for example, the repeated recording period may be long, or the repeated imaging count may be high. Therefore the lower the power consumption of the digital camera 100 the better in the repeated recording period. Especially in the case where the digital camera 100 is battery driven, the power consumption in the repeated recording period should be as low as possible. When the digital camera 100 is battery driven, an increase in the power consumption of the digital camera 100 may decrease the number of times of the imaging (recording process) that can be executed, or may decrease the allowable time to continuously drive the digital camera 100. In other words, an increase in the power consumption of the digital camera 100 decrease the upper limit of the repeated imaging count, the upper limit of the repeated imaging time and the like. As a result, if the power consumption of the digital camera 100 is high, in some cases a desired repeated recording process may not be performed. For example, in order to acquire a time-lapse moving image of a flow of clouds in the course of a day, a long time, more than 10 hours, of repeated recording process must be performed. However, if the power consumption of the digital camera 100 is high, the battery may run out before completing the repeated recording process which exceeds ten hours, and completion of the repeated recording process may be difficult. Therefore reducing the power consumption in the repeated recording period is extremely critical.

When the display unit 111 is turned OFF, the live image is not displayed. Hence it is preferable to stop driving the imaging unit 106 to further reduce the power consumption of the digital camera 100. However, it is necessary to drive the imaging unit 106 in order to perform imaging. If the driving of the imaging unit 106 is stopped, the imaging unit 106 must be restarted in response to the image capturing prior notification before issuing the image capturing notification to perform imaging at every interval time. Further, if it is set that the AE process is performed for each frame, the AE process must be performed in response to the image capturing prior notification, hence the processing time to restart the imaging unit 106 and to perform the AE process is required before imaging.

Figure 5A:
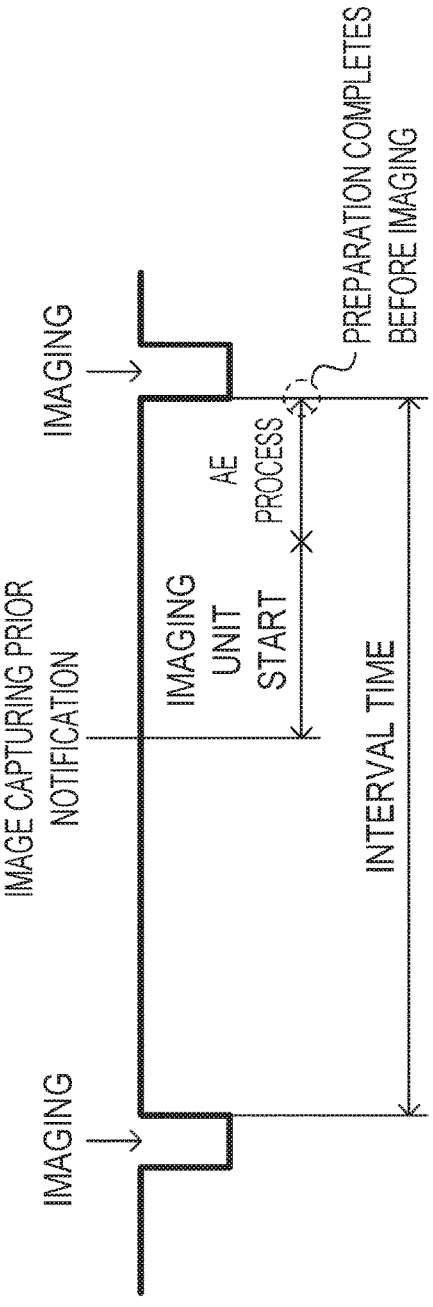
FIGS. 5A and 5B are diagrams depicting an example of the problem to be solved by this embodiment.
Figure 5B:
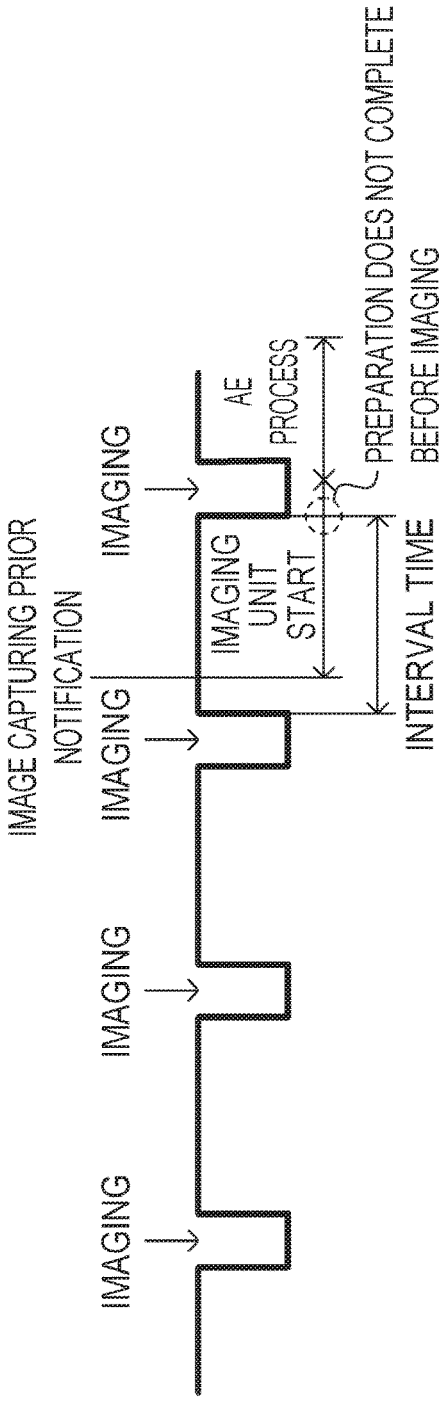

In the case where the interval time (duration of the interval period) is sufficiently long, as depicted in FIG. 5A, both the restarting of the imaging unit 106 and the AE process can be performed during the interval period. Therefore the imaging can be performed without problems. However, in the case where the interval time is short, as depicted in FIG. 5B, the restarting of the imaging unit 106 and the AE process do not complete before the timing at which the imaging (issuing of the image capturing notification), starts. Therefore the imaging cannot be performed. FIG. 5B shows the case where the restarting of the imaging unit 106 does not complete before the timing when the imaging starts, but this problem still occurs if the AE process does not complete before the timing at which the imaging starts, even if the restarting of the imaging unit 106 completes before the timing at which the imaging starts. Hence even in the case where the display unit 111 is turned OFF, it is preferable that the driving of the imaging unit 106 is not stopped. However, not stopping the driving of the imaging unit 106 increases the power consumption of the digital camera 100. This may result in disabling the execution of the repeated recording process of which time is long, or in disabling the repeated recording process of which the repeated imaging count is high.

Figure 6A:
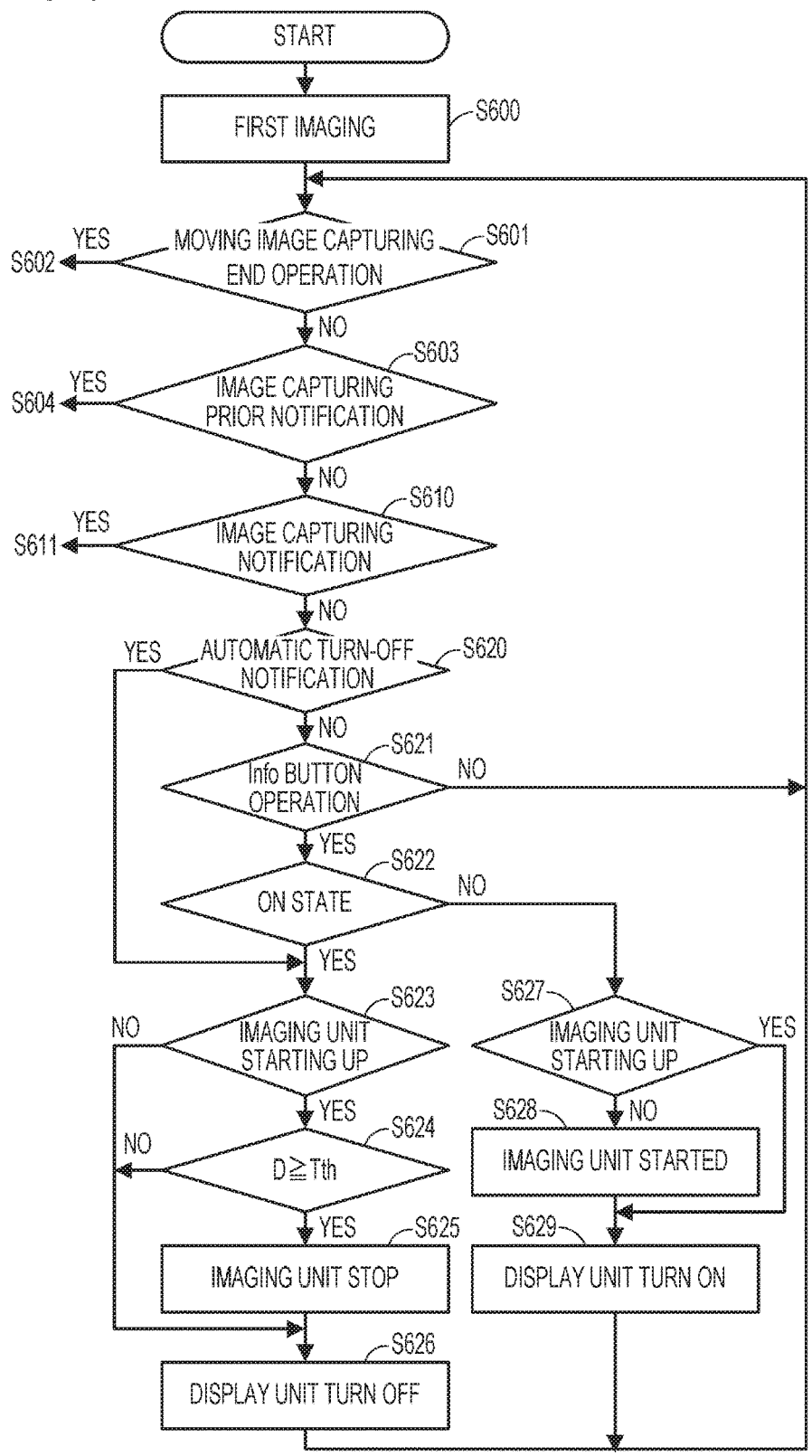
FIGS. 6A and 6B are flow charts depicting an example of the process flow of the repeated recording process according to this embodiment.
Figure 6B:
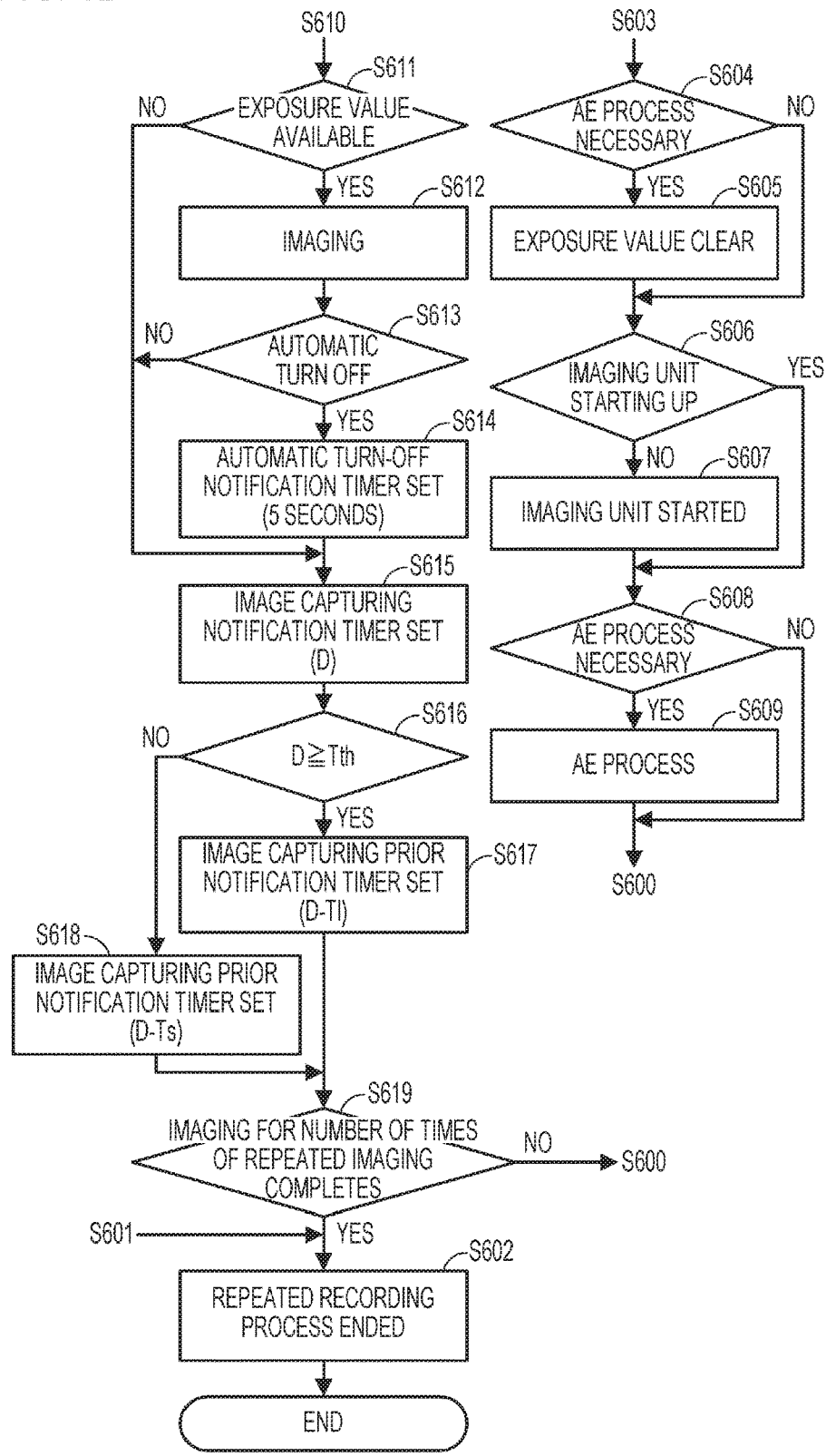

An example of the repeated recording process according to this embodiment will be described in detail with reference to FIGS. 6A and 6B. FIGS. 6A and 6B are flow charts depicting an example of the process flow of the repeated recording process according to this embodiment. The process flow in FIGS. 6A and 6B is implemented by the system control unit 101 which develops programs recorded in the non-volatile memory 114 in the system memory 113, and executes these programs developed in the system memory 113. After various settings on the repeated recording process are performed, the process flow in FIGS. 6A and 6B starts in accordance with the operation to start the repeated recording process. In this embodiment, the operation to start the repeated recoding process is an operation using the Live-view display/moving image capture button 123 in the state when the standby screen is displayed In the following, an example when a captured image is recorded in the recording medium 122 in the repeated recording process will be described, but a captured image may be recorded in the memory 109.

First in S600, the system control unit 101 performs the first imaging (recording process) in the repeated recording process. In concrete terms, the system control unit 101 performs the AF process based on the currently capturing live image (hereafter LV image), and determines the exposure values (exposure parameters). The exposure values include the shutter speed (exposure time), the aperture and the ISO sensitivity. Using the determined exposure values, the system control unit 101 controls the shutter 105 and the imaging unit 106 to perform the imaging process, and captures the still image. Further, the system control unit 101 generates a moving image file (moving image data in which the frame image data does not exist) in the recording medium 122, and records the captured still image as the first frame image of the generated moving image file. In the second or later imaging, the captured image is recorded in the recording medium 122 as a second or later frame image of this moving image file. In this way, a captured image is sequentially added to the moving image file.

The system control unit 101 also records the determined exposure values in the system memory 113. Further, the system control unit 101 records the determined exposure values in the moving image file in the recording medium 122 as attribute information of the first frame of the moving image file which is recorded in the process in S600. In the case where it is set that the AE process is not performed for each frame, the system control unit 101 reads the exposure values determined in the process in S600 from the system memory 113 in the second or later imaging, and uses these exposure values. In the case where it is set that the AE process is performed for each frame, the system control unit 101 sequentially updates the exposure values recorded in the system memory 113. Furthermore, the system control unit 101 sets the timer for the automatic turn-off notification, sets the timer for the image capturing notification, sets the time for the image capturing prior notification and the like using the same process as the process in S613 to S618, which will be described later. Then the process advances to S601.

In S601, the system control unit 101 determines whether the moving image capturing end operation was performed by depressing the Live-view display/moving image capture button 123. If the moving image capturing end operation was performed, the process advances to S602, if not, the process advances to S603.

In S602, the system control unit 101 performs the process to end the repeated recording process. For example, a process to stop reading the captured image from the imaging unit 106, a process to complete the generation of the moving image file (moving image file closing process) and the like are performed. Then this process flow ends.

In S603, the system control unit 101 determines whether the image capturing prior notification was issued. The image capturing prior notification is a command which is issued just prior to the next imaging in the repeated recording process. When the elapsed time from the previous imaging is measured using the system timer 112, and the elapsed time reaches the time set by the timer (later mentioned (D-Tl) or (D-Ts)), the system control unit 101 issues the image capturing prior notification. If the image capturing prior notification is issued (in other words, if the time set by the time (D-Tl) or (D-Ts) has elapsed from the previous imaging), the process advances to S604, and if not, the process advances to S610.

In S604, the system control unit 101 determines whether the AE process is performed or not. If it is set that the AE process is performed for each frame, it is determined that the AE process is performed, and the process advances to S605. If it is set that the AE process is not performed for each frame, it is determined that the AE process is not performed, and the process advances to S606.

In S605, the system control unit 101 clears (cancels) the exposure values stored in the system memory 113, and the process advances to S606.

In S606, the system control unit 101 determines whether the imaging unit 106 has started. If the imaging unit 106 has not started, the process advances to S607. If the imaging unit 106 has started, the process advances to S608.

In S607, the system control unit 101 performs the startup process (first process) to start the imaging unit 106. For example, the system control unit 101 outputs an instruction to start supplying power to the imaging unit 106, to the power control unit 119. Then the power control unit 119 starts supplying power to the imaging unit 106 in accordance with the instruction from the system control unit 101.

Thereby the imaging unit 106 is started, the imaging unit 106 is driven and capturing of the LV image is started. Then the process advances to S608. The startup process is regarded as a "process to switch the state of the imaging unit 106 from the state of not driving the imaging unit 106 to the state of driving the imaging unit 106".

In S608, the system control unit 101 determines whether the AE process is performed or not. It if is set that the AE process is performed for each frame, it is determined that the AE process is performed, and the process advances to S609. If it is set that the AE process is not performed for each frame, it is determined that the AE process is not performed, and the process returns to S601.

In S609, the system control unit 101 performs the AE process based on the captured LV image. Then the exposure values based on the current captured image (LV image) are determined. Then the system control unit 101 records the determined exposure values in the system memory 113. Thereby the exposure values recorded in the system memory 113 are updated. Then the process returns to S601. In the process in S609, the captured image used for the AE process is not limited to the captured image which was generated at the timing when the process in S609 started. For example, a captured image which was generated at a timing that is a predetermined time after the timing when the process in S609 started, or a captured image which was generated at a timing that is a predetermined time before the timing when the process in S609 started, may be used for the AE process.

As mentioned above, the image capturing prior notification is issued in the interval period. Therefore according to this embodiment, if the imaging unit 106 is not driven in the interval period, the system control unit 101 executes the startup process, or a first preparation process which is a combination of the startup process and the AE process. If the imaging unit 106 has been driven in the interval period, the system control unit 101 can execute a second preparation process, which is the AE process. Each of the first preparation process and the second preparation process may include a process which is different from the startup process and the AE process. The second preparation process can be any preparation process that does not include the startup process. When the imaging unit 106 has been driven, the second preparation process, which does not include the AE process, may be performed, regardless whether the AE process is performed for each frame or not.

In S610, the system control unit 101 determines whether the image capturing notification was issued. The image capturing notification is a command which the system control unit 101 issues when the elapsed time from the previous imaging, measured by the system timer 112, reaches the set interval time D, so as to be issued just before the next imaging in the repeated recording process. If the image capturing notification is issued (in other words, if the interval time D has elapsed from the previous imaging), the process advances to S611, and if not, the process advances to S620.

In S611, the system control unit 101 determines whether the system memory 113 stores the exposure values. If the system memory 113 stores the exposure values, the process advances to S612, and if not, the process advances to S615. In the case where the system memory 113 does not store the exposure values, the process may advances to S613.

In S612, the system control unit 101 performs imaging (recording process) in the repeated recording process. In concrete terms, the system control unit 101 performs an imaging process by controlling the shutter 105 and the imaging unit 106 using the exposure values stored in the system memory 113, and captures the still image. Then the system control unit 101 additionally records the captured still image to the recording medium 122 as a second and later frames which continue to be recorded to a conventional moving image file generated in S600. Further, the system control unit 101 records the exposure values, which were used for the process in S612, in the moving image file of the recording medium 122 as attribute information of the frame of the moving image file recorded by the process in S612. Then the process advances to S613.

In S613, the system control unit 101 determines whether a process to automatically turn OFF the display unit 111 is performed or not based on the setting value of the automatic turn-off execute/not execute of the display unit 111. If it is set that the display unit 111 is automatically turned OFF, the process advances to S614, and if it is set that the display unit 111 is not automatically turned OFF, the process advances to S615.

In S614, the system control unit 101 sets the timer for the next automatic turn-off notification, and starts measurement (starts the timer). In this embodiment, "5 seconds" is set as the time for the automatic turn-off notification. Therefore the automatic turn-off notification is issued when 5 seconds have elapsed from the timing when the imaging (process in S612) ended. Then the process advances to S615. If the timer for the automatic turn-off notification has already started in the imaging before the previous time, this process is not performed, and the counting of the timer that started before the previous time continues. In other words, even if the interval time is less than 5 seconds, the timer for the automatic turn-off notification is not updated every time imaging is executed. The timer is counted so that the display unit 111 is turned OFF 5 seconds later from the first imaging in the ON state. On the other hand, if an operation is performed using the operation unit 115 in the ON state, the timer for the automatic turn-off notification is reset at this point and counting of the timer is started again (updated). In other words, even if the counting (5 seconds) of the timer for the automatic turn-off notification is started after the N-th imaging when the display unit 111 is in the ON state, and the next (N+1)-th imaging is performed in the middle of counting 5 seconds, the display unit 111 is turned OFF when 5 seconds elapses in a state where no operation is performed after the N-th imaging. If the counting (5 seconds) of the timer for the automatic turn-off notification is started after the N-th imaging when the display unit 111 is in the ON state, and an operation is performed using the operation unit 115 in the middle of counting 5 seconds, the display unit 111 is turned OFF when 5 seconds elapses in a state where no operation is performed after this operation. In this case, the display unit 111 is turned OFF when the time exceeding 5 seconds elapses from the N-th imaging. In other words, the automatic turn-off notification is issued at a timing when a predetermined time elapses from the recording process or from the imaging for the recording process in the repeated recording process, and the display unit 111 turns OFF. Alternatively, the automatic turn-off notification is issued at a timing when a predetermined time elapses in a state where no operation is performed after the last operation, and the display unit 111 turns OFF.

In S615, the system control unit 101 sets the timer for the next image capturing notification based on the set value of the interval time D, and starts measuring. In this embodiment, the interval time D which is set is set as the timer for the image capturing notification. Thereby the image capturing notification is issued at a timing when the interval time D elapses from the timing of the imaging (process in S612). Then the process advances to S616.

In S616, the system control unlit 101 determines whether the interval time D is a threshold Tth or longer. If the interval time D is the threshold Tth or longer, the process advances to S617. If the interval time D is less than the threshold Tth, the process advances to S618. In this embodiment, the threshold Tth is 4000 msec (4 seconds). The threshold Tth may be longer or shorter than 4000 msec. The threshold Tth is not less than the sum of the imaging starting time (time required for startup process) and the estimated maximum AE time (time that is estimated as the maximum time required for AE process), and is the later mentioned time Tl or longer. The threshold Tth may be the same as the time Tl. The estimated maximum AE time as the time that is estimated as the time required for the AE process in the case where the maximum brightness difference in the captured image is at the upper limit, for example. The threshold Tth may be a predetermined fixed time, or may be a time in accordance with the operation performed by the user, the state of the digital camera 100 or the like.

In S617, the system control unit 101 sets the time (D-Tl) for the timer until the next image capturing prior notification is issued, and starts measurement. Thereby the image capturing prior notification is issued at a timing when the time (D-Tl) elapses from the timing of the imaging (process in S612). In other words, the image capturing prior notification is issued at a timing that is before the next imaging start timing by time Tl. Then the process advances to S619. In this embodiment, the time Tl is 3000 msec. The time Tl may be longer or shorter than 3000 msec. The time Tl can be any time as long as it is not less than the sum of the imaging start time and the estimated maximum AE time, and is not longer than the threshold Tth. The time Tl may be a predetermined fixed time, or may be a time in accordance with the operation performed by the user, the state of the digital camera 100 or the like.

In S618, the system control unit 101 sets the time (D-Ts) as the timer until the next image capturing prior notification is issued, and starts measurement. Thereby the image capturing prior notification is issued at a timing when the time (D-Ts) elapses from the timing of the imaging (process in S612). In other words, the image capturing prior notification is issued at a timing that is before the next imaging start time by time Ts. Then the process advances to S619. In this embodiment, the time Ts is not less than the estimated normal AE time, and less than the time Tl. In concrete terms, the time Ts is 600 msec. The time Ts may be longer or shorter than 600 msec. The time Ts may be a predetermined fixed time, or may be a time in accordance with the operation performed by the user, the state of the digital camera 100 or the like. In most cases, the estimated normal AE time is a time that is determined so that the time required for the AE process becomes the estimated normal AE time or less. The estimated normal AE time can be regarded as the "time that is estimated as the maximum time required for the AE process when the generation probability is a threshold or more".

According to this embodiment, as described above, the timer of the image capturing prior notification is controlled so that the time from the timing of starting preparation process to the timing of starting the next imaging becomes longer in the case where the interval time D is long compared to the case where the interval time D is short. In concrete terms, when the interval time D is less than a threshold (less than the threshold Tth), 600 msec is set as the time from the timing of starting the preparation process to the timing of starting the next imaging. When the interval time D is the threshold or longer (the threshold Tth or longer), 4000 msec is set as the time from the timing of starting the preparation process to the timing of starting the next imaging. In this way, according to this embodiment, the timer for the image capturing prior notification is controlled in accordance with the interval time D, so that the preparation process can be performed as much as possible. The preparation process is the first preparation process or the second preparation process.

In S619, based on the set value of the repeated imaging count, the system control unit 101 determines whether the number of times of imaging performed in the repeated recording process reached the repeated imaging count. If the number of times of imaging performed in the repeated recording process reached the repeated imaging count, the process advances to S602, and if not, the process advances to S601.

In S620, the system control unit 101 determines whether the automatic turn-off notification was issued. The automatic turn-off notification is a command which the system control unit 101 issues when the elapsed time from S614, which is measured by the system timer 112, reaches the time set by the time for the automatic turn-off notification (5 seconds). If the automatic turn-off notification is issued (in other words, if the time of the timer for the automatic turn-off notification elapsed from the previous imaging), the process advances to S623, and if not, the process advances to S621.

In S621, the system control unit 101 determines whether the Info button 125 was depressed. If the Info button 125 was depressed, the process advances to S622, and if not, the process returns to S601.

In S622, the system control unit 101 determines whether the display unit 111 is turned ON (whether the display unit 111 is the ON state or not). If the display unit 111 is turned ON, the process advances to S623, and if not (if the display unit 111 is turned OFF), the process advances to S627.

In S623, the system control unit 101 determines whether the imaging unit 106 has been started or not. If the imaging unit 106 has been started, the process advances to S624, and if not, the process advances to S626.

In S624, the system control unit 101 determines whether the interval time D which is set is the threshold Tth (4000 msec, a specific time) or longer. If the interval time D is the threshold Tth or longer (a specific time or longer) the process advances to S625. If the interval time D is less than the threshold Tth (less than the specific time), the process advances to S626.

In S625, the system control unit 101 performs the process to stop driving the imaging unit 106 (stop process). For example, the system control unit 101 outputs an instruction, to stop supplying power to the imaging unit 106, to the power control unit 119. Then the power control unit 119 stops supplying power to the imaging unit 106, in accordance to the instruction from the system control unit 101. Thereby the driving of the imaging unit 106 is stopped, the imaging unit 106 is not driven any more, and the live image is no longer captured. As a consequence, the power consumption of the digital camera 100 can be reduced by the amount of power consumed for driving the imaging unit 106. Then the process advances to S626. The stop process is regarded as a "process to switch the state of the imaging unit 106 from the state when the imaging unit 106 is being driven to the state when the imaging unit 106 is not driven".

In S626, the system control unit 101 performs the turn-off process to turn the display unit 111 OFF. Then the process returns to S601. By the process in S626, the live-view display, displayed on the display unit 111, is turned OFF. By this process, the power consumption of the digital camera 100 can be reduced by the amount of power consumed for driving the display unit 111. In this way, the display unit 111 also turns OFF at a timing when the user performs the operation to turn OFF the live-view display (turn-off operation). The process in S626 can be any process as long as the power consumption of the display unit 111 is reduced by turning OFF the live-view display on the display unit 111 (power saving state), and the display brightness (backlight brightness) may be reduced (brightness reduction) instead of turning the display unit 111 OFF. When the process in S626 is performed in response to issuing of the automatic turn-off notification, the display unit 111 may already be in the turn-off state (power saving state) at the timing of the process in S626. In such a case, the process in S626 is omitted.

According to this embodiment, as described above, the driving stop process of the imaging unit 106 and the turn-off process of the display unit 111 (transition process to the power saving state) are performed when the interval time D which is set is the threshold Tth or longer. Thereby the power consumption of the digital camera 100 can be reduced considerably. Further, the turn-off process of the display unit 111 is also performed when the interval time D which is set is less than the threshold Tth. Thereby the power consumption of the digital camera 100 can be reduced by the amount of power consumed for driving the display unit 111. This means that, according to this embodiment, the power consumption of the digital camera 100 can be reduced when the interval time D which is set is the threshold Tth or longer, or less than the threshold Tth.

According to this embodiment, when the interval time D which is set is less than the threshold Tth, the driving stop process of the imaging unit 106 is not performed, and the driving of the imaging unit 106 continues even when the current timing is in the interval period. Therefore if the interval time D is less than the threshold Tth, the startup process in the interval period (startup process in S607) is omitted. Thereby when the AE process is performed for the next imaging, the AE process can be quickly started without waiting for the startup process after the image capturing prior notification is issued. Hence the possibility of not completing the preparation process (AF process in S609) by the next imaging can be decreased. Further, the possibility that the imaging unit 106 is not started at the timing of the next imaging is eliminated. In the case where the interval time D which is set is the threshold Tth or longer, the time from the issue of the image capturing prior notification to the next imaging is time Tl, which is sufficiently long. Therefore it is unlikely that the preparation process (startup process in S607 and/or the AE process in S609) does not complete by the next imaging.

In this embodiment, it is assumed that the imaging starting time (time required for the startup process to start the imaging unit 106) is 500 msec, and the estimated. maximum AE time is 1800 msec. Therefore in this embodiment, a time not less than 2300 msec, which is the sum of the imaging starting time 500 msec and the estimated maximum AE time 1800 msec, is used as the time Tl. The imaging starting time may be longer or shorter than 500 msec. The estimated maximum AE time may be longer or shorter than 1800 msec.

A time not less than the sum of the imaging starting time and the time Ts may be used as the time Tl. The time, which is not less than the sum of the imaging starting time and the time Ts and is less than the SUM of the imaging starting time and the estimated maximum AE time, may be used as the time Tl. The time, which is less than the sum of the imaging starting time and the time Ts and is not less than the sum of the imaging starting time and the estimated maximum AE time, may be used as the time Tl.

As the time Tl is shorter, the period when the driving of the imaging unit 106 is stopped is longer. In other words, as the time Tl is shorter, the period when the power consumption of the imaging unit 106 is reduced is longer. Therefore it is preferable that the time Tl is shorter as long as the time Tl is not less than the sum of the imaging starting time and the estimated maximum AE time, or the sum of the imaging starting time and the time Ts.

In S627, the system control unit 101 determines whether the imaging unit 106 has been started. If the imaging unit 106 is not started, the process advances to S628. If this is not the case, the process advances to S629.

In S628, the system control unit 101 performs the startup process to start the imaging unit 106. Thereby capturing of a live image is started. Then the process advances to S629.

In S629, the system control unit 101 performs the turn-on process to turn the display unit 111 ON. Thereby the live-view display is started (restarted). In this way, if the Info button 125 is depressed (display instruction operation) when the display unit 111 is in the OFF state, the display unit 111 is turned ON. If the Info button 125 is depressed (display instruction operation) when the display unit 111 is not turned OFF but is in the brightness reduction state to conserve power, the brightness of the display unit 111 is returned to the full state.

In this embodiment, the live-view display is performed like this in the period when the display unit 111 is ON. If the imaging unit 106 is not started at the timing to start the live-view display, the imaging unit 106 is started by the process in S628. Therefore in the live-view per period when the live-view display is performed, the imaging unit 106 can be driven, even if the current timing is included in the interval period. As a result, the live-view display can be performed in the live-view period.

In this embodiment, the processes in S620 to S629 are performed in the interval period. In concrete terms, the process in S620 to S629 are performed in the period from the timing when the imaging (recording process) completed to the timing when the next image capturing prior notification is issued.

An example of the effect of this embodiment will be described with reference to FIGS. 5C and 5D. FIG. 5C shows an example when the interval time D is not less than the threshold Tth, and FIG. 5D shows an example when the interval time D is less than the threshold Tth.

When the interval time D is not less than the threshold Tth, the driving of the imaging unit 106 is stopped as the display unit 111 is turned OFF, as depicted in FIG. 5C. Hence the power consumption of the digital camera 100 can be reduced considerably. When the interval time D is not less than the threshold Tth, the image capturing prior notification is issued at a timing that is before the next imaging by time Tl, so that a sufficiently long time can be taken as the time for the startup process and the AE process. As a result, the startup process and the AE process can be completed within the interval period (at high probability), and imaging can be performed at a desired timing (at high probability).

Even when the interval time D is less than the threshold Tth, the display unit 111 is turned OFF, as depicted in FIG. 5D. Hence the power consumption of the digital camera 100 can be reduced. When the interval time D is less than the threshold Tth, the driving of the imaging unit 106 is not stopped even if the display unit 111 is turned OFF. This means that it is unnecessary to perform the startup process in the interval period. Therefore the image capturing prior notification is issued at a timing that is before the next imaging by time Ts (shorter than time Tl), so that sufficient time can be taken for the AE process, without concern for the startup process of the imaging unit 106. As a result, the AE process can be completed within the interval period (at high probability) and imaging can be performed at a desired timing (at high probability).

As described above, according to this embodiment, when the repeated recording process, in which the interval time D is not less than the threshold Tth, is performed, the power consumption of the display unit 111 is reduced, and the driving of the imaging unit 106 is stopped in the interval period. Further, when the repeated recording process, in which the interval time D is less than the threshold Tth, is performed, the power consumption of the display unit 111 is reduced, and the imaging unit 106 is driven regardless whether the current timing is included in the interval period or not. Thereby both the reduction of the power consumption of the digital camera 100 and the execution of imaging (recording process) at a desired timing can be implemented in the repeated recording period.

In this embodiment, the time Ts is 600 msec, which is shorter than the estimated maximum AE time 1800 msec. Therefore the AE process requires a longer time than the time Ts, and in some cases the AE process may not be completed by the next imaging. Generally if the interval time D is short, less than Tth, the brightness of the object does not change very much compared with the case where the interval time D is long. For example, if the interval time D is long, such as 12 hours, it is possible that the N-th imaging is during the daytime, and the subsequent (N+1)-th imaging is during the nighttime and in the dark, and the AE process will take time because of the large brightness difference. However, if the interval time D is less than Tth (4 seconds in this embodiment), it is unlikely to image an object with a large brightness difference, such as the difference between daytime and nighttime. In other words, if the interval time D is Less than Tth, the time required for the AE process is the time Ts or less in most cases, hence a situation, when the time required for the AE process becomes longer than the time Ts, rarely occurs. Further, in the case where the time Ts is used, the interval time D is less than the threshold Tth, hence the driving of the imaging unit 106 is not stopped. Therefore even if a situation when the time required for the AE process becomes longer than the time Ts does occur, in most cases the AE process completes by the imaging after the next imaging. This means that it is extremely rare that imaging is skipped for many frames, and the state, where the time required for the AE process longer than the time Ts, has little influence on the repeated recording process.

Between the process in S623 and the process in S624, the system control unit 101 may determine whether it is set that the AE process is performed for each frame. If it is set that the AE process is performed for each frame, the process may advance to S624, and if it is set that the AE process is not performed for each frame, the process may advance to S625, skipping the S624 process. In other words, when the AE process (second process) is not performed, the driving stop process of the imaging unit 106 may be performed in the interval period, regardless whether the interval time D is the threshold Tth or longer Thereby the power consumption of the digital camera 100 can be further reduced. If the AE process is not performed, the time required for the preparation process (startup process) is short, hence the preparation process can be completed within the interval period at a high probability and the imaging can be performed at a desired timing at a high probability, regardless whether the interval time D is the threshold Tth or longer.

Between the process in S615 and the process in S616, the system control unit 101 may determine whether it is set that the AE process is performed for each frame. If it is set that the AE process is performed for each frame, the process may advance to S616, and if it is set that the AE process is not performed for each frame, another process may be performed instead of the processes in S616 to S618.

In concrete terms, when it is set that the AE process is not performed for each frame, the system control unit 101 may set the time (D-Tx) as the time of the next capturing prior notification, regardless whether the interval time D is the threshold Tth or longer or not. Then the image capturing prior notification is issued at a timing that is before the timing of starting the next imaging by time Tx, and the preparation process is started when necessary. For the time Tx, the time shorter than time Tl is used. The time Tx may be the same as or different from the time Ts. Thereby when the AF process in S609 is not performed, it can be prevented that the startup process in S607 is executed at an early timing for the AE process (timing that is before the timing of starting the imaging by time Tl). As a result, an increase in the power consumption due to the early execution of the startup process can be prevented.

At least one of the time Tl and the time is may be changed in accordance with the interval time D. For example, in the case where the interval time D is long, the time which is longer than the case where the interval time D is short may be used as the time Ts. In concrete terms, when the interval time D is less than the threshold Tth, the possibility of a state where the AE process is not performed by the next imaging can be decreased by starting the AE process as early as possible. Therefore the time Ts=D−d may be used in S618. In other words, in S618, the time d may be set as the timer for the next image capturing prior notification. The time d is 0 msec or longer, and about 50 msec, for example. The time d is the time required to start the next AE process. The time d may be 0 msec. If the time d is 0 msec, the system timer 112 issues the image capturing prior notification immediately after setting the timer for the image capturing prior notification is set, without counting (measuring time). Then the process advances to S604, and the AE process is started at an early timing. This is the same for the time Tl.

In this embodiment, an example when the time-lapse moving image is recorded in the recording medium 122 by the repeated recording process was described, but the present invention is riot limited to this. For example, the captured image may be recorded in the recording medium 122 as a still image in each of the plurality of imaging steps (recording process) in the repeated recording process. In other words, a plurality of captured images, corresponding to a plurality of imaging steps in the repeated recoding process, may be recorded in the recording medium 122 as a plurality of still images (a plurality of still image files, or a single image file, including a plurality of still images).

In this embodiment, an example when the stop process in S625, the turn-off process in S626 and the like are performed at a timing when the user performed the operation, and a timing when 5 seconds elapsed from the imaging end time, was described. In concrete terms, the stop process in S625, the turn-off process in S626 and the like are performed at a timing corresponding to the issue of the automatic turn-off notification, and at a timing corresponding to the issue of the Info button notification. However, the timings when the stop process in S625, the turn-off process in S626 and the like are performed are not limited to these. The timings when the stop process in S625, the turn-off process in S626 and the like are performed need not include at least one of a timing corresponding to the issue of the automatic turn-off notification and a timing corresponding to the issue of the Info button notification. Timings when the stop process in S625, and the turn-off process in S626 and the like are performed may include other predetermined timings. The stop process in S625 may be executed responding to a notification that is different from the notification for the turn-off process in S626. In the case where the live-view display is not performed, the turn-off process may be performed in a period that is different from the interval period. When the live-view display is not performed, the stop process may be performed at a timing when the imaging (recording process) ends, each time the imaging is performed. Thereby the power consumption of the digital camera 100 can be further reduced.

In this embodiment, an example when the power consumption of the display unit 111 is reduced by turning OFF the display unit 111 was described, but the present invention is not limited to this. For example, the power consumption of the display unit 111 may be reduced by reducing the brightness (display brightness) of the display unit 111. In the case where a combination of a light-emitting unit and a modulation panel are used as the display unit 111, the display brightness can be reduced by reducing the emission brightness of the light-emitting unit. In the case where a display panel having light-emitting display elements is used as the display unit 111, the display brightness can be reduced by reducing the emission brightness of the display elements. The power consumption of the display unit 111 may be reduced by reducing the number of colors, brightness values, contrast, gradation and the like of the image (display image) displayed on the display unit 111.

Various controls described above are assumed to be performed by the system control unit 101, but may be performed by one hardware unit or may be shared by a plurality of hardware units. The above embodiment is merely an example, and the present invention is not limited to the above embodiment. Various modes within the scope of the essence of the invention are also included in the present invention.

In this embodiment, an example when the present invention is applied to a digital camera was described, but the present invention can be applied to any imaging apparatus which has an imaging unit and a display unit. For example, the present invention can be applied to a personal computer, a PDA, a portable telephone terminal (including a smartphone) and the like which include an imaging unit and a display unit. The present invention can also be applied to a portable type image viewer, a printer device, a digital photo frame, a music player, a game machine, an electronic book reader, a tablet terminal, a projection apparatus, a home electronic appliance, an on-vehicle apparatus and the like which include an imaging unit and a display unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-221251, filed on Nov. 14, 2016, which is hereby incorporated by reference herein in its entirety.

What is claimed is:

1. An imaging apparatus, comprising:
an imaging unit;
a display unit; and
a memory and at least one processor which function as:
a control unit configured, in a period of performing a repeated recording process to perform imaging by the imaging unit at every set interval time and record a captured image in a recording medium, to perform control such that a live-view display on the display unit is turned OFF and driving of the imaging unit is stopped in a case where the interval time is a specific time or longer, and such that the live-view display on the display unit is turned OFF, but the driving of the imaging unit is not stopped in a case where the interval time is less than the specific time.

2. The imaging apparatus according to claim 1, wherein the control unit performs control such that the live-view display on the display unit is turned OFF at a specific timing in the period when the repeated recording process is performed.

3. The imaging apparatus according to claim 2, wherein the specific timing includes a timing when predetermined time has elapsed from recording or imaging for the recording in the repeated recording process.

4. The imaging apparatus according to claim 2, wherein the specific timing includes a timing when a user performs an operation to turn OFF the live-view display.

5. The imaging apparatus according to claim 2, wherein the specific timing includes a timing when a predetermined time has elapsed in a state where no operation is performed after the last operation.

6. The imaging apparatus according to claim 1, wherein when a display instruction operation is performed by a user in a state where the live-view display on the display unit is turned OFF in the period of performing the repeated recording process, the control unit performs control such that the live-view display on the display unit is restarted.

7. The imaging apparatus according to claim 1, wherein when each imaging is performed for recording in the repeated recording process, the control unit performs control such that the imaging is performed after a specific preparation process based on the image captured by the imaging unit is performed.

8. The imaging apparatus according to claim 7, wherein the specific preparation process is an automatic exposure process to automatically determine exposure parameters.

9. The imaging apparatus according to claim 7, wherein the specific preparation process is performed based on a live image captured by the imaging unit.

10. The imaging apparatus according to claim 7, wherein in a case where the interval time is less than the specific time, the control unit performs control such that the specific preparation process is performed at a timing closer to each imaging for recording in the repeated recording process, than in a case where the interval time is the specific time or longer.

11. The imaging apparatus according to claim 7, wherein the specific time is not less than the sum of time required for the imaging unit, which is in an undriven state, to be driven, and estimated maximum time of the time required for the specific preparation process.

12. The imaging apparatus according to claim 7, wherein the memory and at least one processor further function as a setting unit configured to set whether the specific preparation process is performed or not upon each imaging, wherein
in a case where the setting unit sets to perform the specific preparation process upon each imaging, the control unit performs control such that the imaging is performed after the specific preparation process based on the image captured by the imaging unit is performed when each imaging is performed for recording in the repeated recording process.

13. The imaging apparatus according to claim 12, wherein in a case where the setting unit sets not to perform toe specific preparation process upon each imaging, the control unit performs control such that the live-view display on the display unit is turned OFF and the driving of the imaging unit is stopped also in a case where the interval time is less than the specific time.

14. The imaging apparatus according to claim 1, wherein in a case where the imaging unit is not driven when the imaging is performed for recording in the repeated recording process, the control unit performs control such that the imaging is performed after the driving of the imaging unit is started.

15. The imaging apparatus according to claim 1, wherein in a case where the live-view display on the display unit is turned OFF, the control unit performs control such that the display unit is turned OFF or brightness thereof is reduced.

16. A control method of an imaging apparatus including an imaging unit and a display unit, the control method comprising:
in a period of performing a repeated recording process to perform imaging by the imaging unit at every set interval time and record a captured image in a recording medium,
a first control step of performing control such that a live-view display on the display unit is turned OFF and driving of the imaging unit is stopped in a case where the interval time is a specific time or longer; and
a second control step of performing control such that the live-view display on the display unit is turned OFF, but the driving of the imaging unit is not stopped in a case where the interval time is less than the specific time.

17. A non-transitory computer readable medium that stores a program, wherein
the program causes a computer to execute a control method of an imaging apparatus including an imaging unit and a display unit, and
the control method includes
in a period of performing a repeated recording process to perform imaging by the imaging unit at every set interval time and record a captured image in a recording medium,
a first control step of performing control such that a live-view display on the display unit is turned OFF and driving of the imaging unit is stopped in a case where the interval time is a specific time or longer; and
a second control step of performing control such that the live-view display on the display unit is turned OFF, but the driving of the imaging unit is not stopped in a case where the interval time is less than the specific time.

18. An imaging apparatus, comprising:
an imaging unit;
a display unit; and
a memory and at least one processor which function as:
a control unit configured, in a period of performing a repeated recording process to perform imaging by the imaging unit at every set interval time and record a captured image in a recording medium, to perform control such that a live-view display on the display unit is turned OFF in a case where the interval time is a specific time or longer, and such that the live-view display on the display unit is turned OFF, but the driving of the imaging unit is not stopped in a case where the interval time is less than the specific time.

19. A control method of an imaging apparatus including an imaging unit and a display unit, the control method comprising:
in a period of performing a repeated recording process to perform imaging by the imaging unit at every set interval time and record a captured image in a recording medium,
a first control step of performing control such that a live-view display on the display unit is turned OFF in a case where the interval time is a specific time or longer; and
a second control step of performing control such that the live-view display on the display unit is turned OFF, but the driving of the imaging unit is not stopped in a case where the interval time is less than the specific time.

20. A non-transitory computer readable medium that stores a program, wherein
the program causes a computer to execute a control method of an imaging apparatus including an imaging unit and a display unit, and
the control method includes:
in a period of performing a repeated recording process to perform imaging by the imaging unit at every set interval time and record a captured image in a recording medium,
a first control step of performing control such that a live-view display on the display unit is turned OFF in a case where the interval time is a specific time or longer; and a second control step of performing control such that the live-view display on the display unit is turned OFF, but the driving of the imaging unit is not stopped in a case where the interval time is less than the specific time.

* * * * *